(12) United States Patent
Pye et al.

(10) Patent No.: US 12,540,845 B2
(45) Date of Patent: Feb. 3, 2026

(54) SYSTEM FOR TESTING LIGHT SOURCES

(71) Applicant: Teradyne, Inc., North Reading, MA (US)

(72) Inventors: Richard Pye, Burlington, MA (US); Xianfeng Lin, Bedford, MA (US); Timothy Jackson Smith, Melrose, MA (US)

(73) Assignee: Teradyne, Inc., North Reading, MA (US)

( * ) Notice: Subject to any disclaimer, the term of this patent is extended or adjusted under 35 U.S.C. 154(b) by 47 days.

(21) Appl. No.: 18/600,908

(22) Filed: Mar. 11, 2024

(65) Prior Publication Data
US 2025/0283754 A1 Sep. 11, 2025

(51) Int. Cl.
*G01J 1/42* (2006.01)
*G01J 1/02* (2006.01)
*G01J 1/04* (2006.01)
*G01J 1/24* (2006.01)

(52) U.S. Cl.
CPC ............... *G01J 1/42* (2013.01); *G01J 1/0228* (2013.01); *G01J 1/0492* (2013.01); *G01J 1/24* (2013.01); *G01J 2001/242* (2013.01); *G01J 2001/4252* (2013.01)

(58) Field of Classification Search
CPC .......... G01J 1/0228; G01J 1/0492; G01J 1/22; G01J 1/24; G01J 1/42; G01J 2001/242; G01J 2001/4252
See application file for complete search history.

(56) References Cited

U.S. PATENT DOCUMENTS

| 4,896,965 | A  |   | 1/1990  | Goff et al.              |
|-----------|----|---|---------|--------------------------|
| 6,621,566 | B1 |   | 9/2003  | Aldrich et al.           |
| 7,088,088 | B1 | * | 8/2006  | Marzalek ........... G01R 31/2822 |
|           |    |   |         | 324/76.19                |
| 8,879,152 | B2 | * | 11/2014 | Junger ................... G02B 5/204 |
|           |    |   |         | 359/590                  |

(Continued)

FOREIGN PATENT DOCUMENTS

| KR | 10-2011-0045227 A | 5/2011 |
| KR | 10-2023-0068578 A | 5/2023 |
| WO |    2018112267 A1  | 6/2018 |

OTHER PUBLICATIONS

International Search Report and Written Opinion received for PCT Patent Application No. PCT/US2025/018848, mailed on Jun. 27, 2025, 9 pages.

*Primary Examiner* — Kevin K Pyo
(74) *Attorney, Agent, or Firm* — ArentFox Schiff LLP

(57) ABSTRACT

An example system includes a first color bandpass filter to receive part of light from a light source and a second color bandpass filter to receive part of the light from the light source. The first color bandpass filter and the second color bandpass filter each has a cutoff wavelength at a band edge. The first color bandpass filter and the second color bandpass filter each has a band edge within a predefined distance of a nominal wavelength of the light source. The first color bandpass filter and the second color bandpass filter is each configured to output filtered light that is based on received parts of the light. One or more processing devices are configured to perform operations that include determining at least first and second values based on the filtered light.

28 Claims, 10 Drawing Sheets

(56) References Cited

U.S. PATENT DOCUMENTS

| | | |
|---|---|---|
| 10,345,418 B2 | 7/2019 | Wadell et al. |
| 10,891,882 B1 | 1/2021 | Baroughi et al. |
| 10,896,106 B2 | 1/2021 | Panis et al. |
| 10,930,201 B1 | 2/2021 | Baroughi et al. |
| 11,004,894 B2 | 5/2021 | Ahmed et al. |
| 11,272,616 B2 | 3/2022 | Brecht et al. |
| 11,442,098 B2 | 9/2022 | Wadell et al. |
| 11,798,481 B2 | 10/2023 | Lin et al. |
| 2012/0028375 A1 | 2/2012 | Sato et al. |
| 2013/0102091 A1 | 4/2013 | King et al. |
| 2014/0061448 A1 | 3/2014 | Yu et al. |
| 2014/0240304 A1 | 8/2014 | In et al. |
| 2014/0240518 A1 | 8/2014 | Lewinnek et al. |
| 2014/0267683 A1 | 9/2014 | Bibl et al. |
| 2014/0299837 A1 | 10/2014 | Bibl et al. |
| 2015/0153031 A1 | 6/2015 | Myers et al. |
| 2024/0027340 A1 | 1/2024 | Watanabe et al. |

\* cited by examiner

SYSTEM FOR TESTING LIGHT SOURCES

TECHNICAL FIELD

This specification describes example implementations of systems for testing light sources, such as light emitting diodes (LEDs).

BACKGROUND

A test system is configured to test the operation of a device. A device tested by a test system is referred to as a device under test (DUT). An example of a type of DUT that may be tested using a test system is a light source, such as a light emitting diode (LED). An LED is a semiconductor device that emits light when current flows through it. LEDs come in different sizes. For example, a micro-LED may be $\frac{1}{100}^{th}$ the size of a regular LED of about one to two millimeters in width or less. Micro-LEDs may be used, for example, to produce high-resolution displays for electronic devices. In general, the smaller an LED is, the more difficult it can be to test the LED and, in the case of large numbers of LEDs, the more time consuming it can be to test the LEDs.

Systems for testing small form factor LEDs, such as micro-LEDs, for display applications are expected to test each individual LED on the display. In some cases, millions of such LEDs may be built on a single semiconductor wafer. High-end displays may require color matching and binning with one nanometer (nm) wavelength bins. Some existing LED test systems may use filters that may not be particularly sensitive to small shifts in wavelength of LEDs that produce colors such as red, green and blue, which are generally used in color display applications. In addition, in some cases, test results produced by such systems may not be particularly accurate for narrowband light sources such as LEDs.

SUMMARY

An example system includes a first color bandpass filter to receive part of light from a light source and a second color bandpass filter to receive part of the light from the light source. The first color bandpass filter and the second color bandpass filter each has a cutoff wavelength at a band edge. The first color bandpass filter and the second color bandpass filter each has a band edge within a predefined distance of a nominal wavelength of the light source. The first color bandpass filter and the second color bandpass filter is each configured to output filtered light that is based on received parts of the light. One or more processing devices are configured to perform operations that include determining at least first and second values based on the filtered light. The example system may include one or more of the following features, either alone or in combination.

The first and second values correspond to a color space. The system may include memory storing a look-up table (LUT) containing data corresponding to different wavelengths of light and line widths of light. The operations may include obtaining the wavelength and the line width of the light from the LUT using the first and second values. The data may be organized based on ratios that are based on filtered light. The first and second values may include: a first ratio based on a first intensity of first filtered light output from the first color bandpass filter and the second color bandpass filter; and a second ratio based on a second intensity of second filtered light output from the first color bandpass filter and the second color bandpass filter. The system may include a clear filter to pass visible light. The second value may be based also a third intensity of light output from the clear filter.

The first value may be defined as follows:

$$10 * \log_{10}((\text{first intensity of light})/(\text{second intensity of light}))$$

The second value may be defined as follows:

$$10 * \log_{10}(((\text{first intensity of light}) + (\text{second intensity of light}))/(\text{third intensity of light}))$$

At least one of the first color bandpass filter or the second color bandpass filter may be rectangular in shape. Each of the first color bandpass filter and the second color bandpass filter wavelength cutoff may be steep and monotonic. The first color bandpass filter and the second color bandpass filter may each have a width that is substantially equal to a spectral line width of the light source.

The operations may include comparing at least one of the wavelength or the line width to a predefined wavelength or a predefined line width, respectively, and binning the light source based on the comparing. Comparing may include comparing the wavelength to an upper limit and to a lower limit. The upper limit may have a greater magnitude than the lower limit. Binning may include storing data for the light source based on whether the wavelength or the line width is between the upper and lower limit.

If the wavelength is between the upper limit and the lower limit, the data indicates that the light source has passed testing. If the wavelength is above the upper limit or below the lower limit, the data indicates that the light source has failed testing.

The light source may be a light emitting diode (LED). Cutoff wavelengths of the first color bandpass filter and the second color bandpass filter may be separated by a spectral gap. The spectral gap may be different for different colors of light. The first color bandpass filter and the second color bandpass filter have equal bandwidths.

The system may include a camera to capture the light from the light source. The first color bandpass filter and the second color bandpass filter may be part of a component configured for incorporation into the camera. The light source may be on a wafer under test and a lens of the camera may be directed at the wafer to capture the light from the light source. The spectral gap between band edges of the filters may be on the order of single-digit nanometers to tens of nanometers.

An example system includes a first color bandpass filter to receive parts of light from light sources having known wavelengths and line widths and a second color bandpass filter to receive parts of the light from the light sources having the known wavelengths. The first color bandpass filter and the second color bandpass filter each may have a cutoff wavelength at a band edge. The first color bandpass filter and the second color bandpass filter each may have a band edge that is within single-digit nanometers of a nominal wavelength of a light source. The first color bandpass filter and the second color bandpass filter may be separated by a spectral gap. The first color bandpass filter and the second color bandpass filter each may be configured to output filtered light that is based on received parts of the light from each light source. One or more processing devices may be configured to perform the following operations: determining two values based on filtered light from each light source, where the two values correspond to a color space, and populating a database with information corresponding to the two values. The database may include a look-up table. The values may include ratios.

An example system includes a first color bandpass filter to receive part of light from a light source and a second color bandpass filter to receive part of the light from the light source. The first color bandpass filter and the second color bandpass filter each may have a cutoff wavelength at a band edge. The first color passband filter and the second color bandpass filter each may have a band edge that is within a predefined distance of a nominal wavelength of the light source. The first color bandpass filter may have first passband. The second color bandpass filter may have a second passband. The first color bandpass filter and the second color bandpass filter each may be configured to output filtered light that is based on received parts of the light. One or more processing devices may be configured to perform operations that include determining first and second values based on the filtered light. The first and second values correspond to a color space. The system may include one or more of the following features, either alone or in combination.

The system may include a notch filter having a stopband. The system may include memory storing data corresponding to different wavelengths of light and line widths of light. The data may be organized based on ratios from color-bandpass-filtered light. The first and second values may include: a first value based on a first intensity of first filtered light output from the first color bandpass filter and a second intensity of second filtered light output from the second color bandpass filter; and a second value based on the first intensity of first filtered light output from the first color bandpass filter, the second intensity of second filtered light output from the second color bandpass filter, and a third intensity of third filtered light output from the notch filter.

The first value may be defined as:

$$10 * \log_{10}((\text{first intensity of light})/(\text{second intensity of light}))$$

The second value may be defined as:

$$10 * \log_{10}((\text{third intensity of light})/(\text{third intensity of light} + \text{first intensity of light} + \text{second intensity of light})).$$

The predefined distance may be on the order of single-digit nanometers to tens of nanometers.

Any two or more of the features described in this specification, including in this summary section, may be combined to form implementations not specifically described in this specification.

At least part of the devices, circuitry, systems, techniques, and processes described in this specification may be implemented or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, circuitry, systems, techniques, and processes described in this specification may be implemented or controlled using a computing system comprised of one or more processing devices and memory storing instructions that are executable by the one or more processing devices to perform various control operations. The devices, circuitry, systems, techniques, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of systems configured to test light sources. Light emitting diodes (LEDs), including small form factor LEDs, are examples of light sources that can be tested using the systems. Small form factor LEDs may include, but are not limited to, micro-LEDs.

In some examples, a micro-LED has a size when viewed from above—for example, a footprint or outline—that is 500 square micrometers ($\mu m^2$) or less, 400 $\mu m^2$ or less, 300 $\mu m^2$ or less, 200 $\mu m^2$ or less, 100 $\mu m^2$ or less, 75 $\mu m^2$ or less, 50 $\mu m^2$ or less, 40 $\mu m^2$ or less, 30 $\mu m^2$ or less, 20 $\mu m^2$ or less, 15 $\mu m^2$ or less, 10 $\mu m^2$ or less, 5 $\mu m^2$ or less, 4 $\mu m^2$ or less, 3 $\mu m^2$ or less, 2 $\mu m^2$ or less, or 1 $\mu m^2$ or less. Accordingly, when used herein, the terms "LED" and light source may include, but are not limited to, micro-LEDs, LEDs that are larger than micro-LEDS, and various types of LEDs, such as organic LEDs (OLEDs) and others not listed. The LEDs that are tested are typically part of a wafer, with an individual wafer potentially having hundreds, thousands, tens of thousands, hundreds of thousands, or millions of LEDs that are to be tested concurrently.

Figure 1:
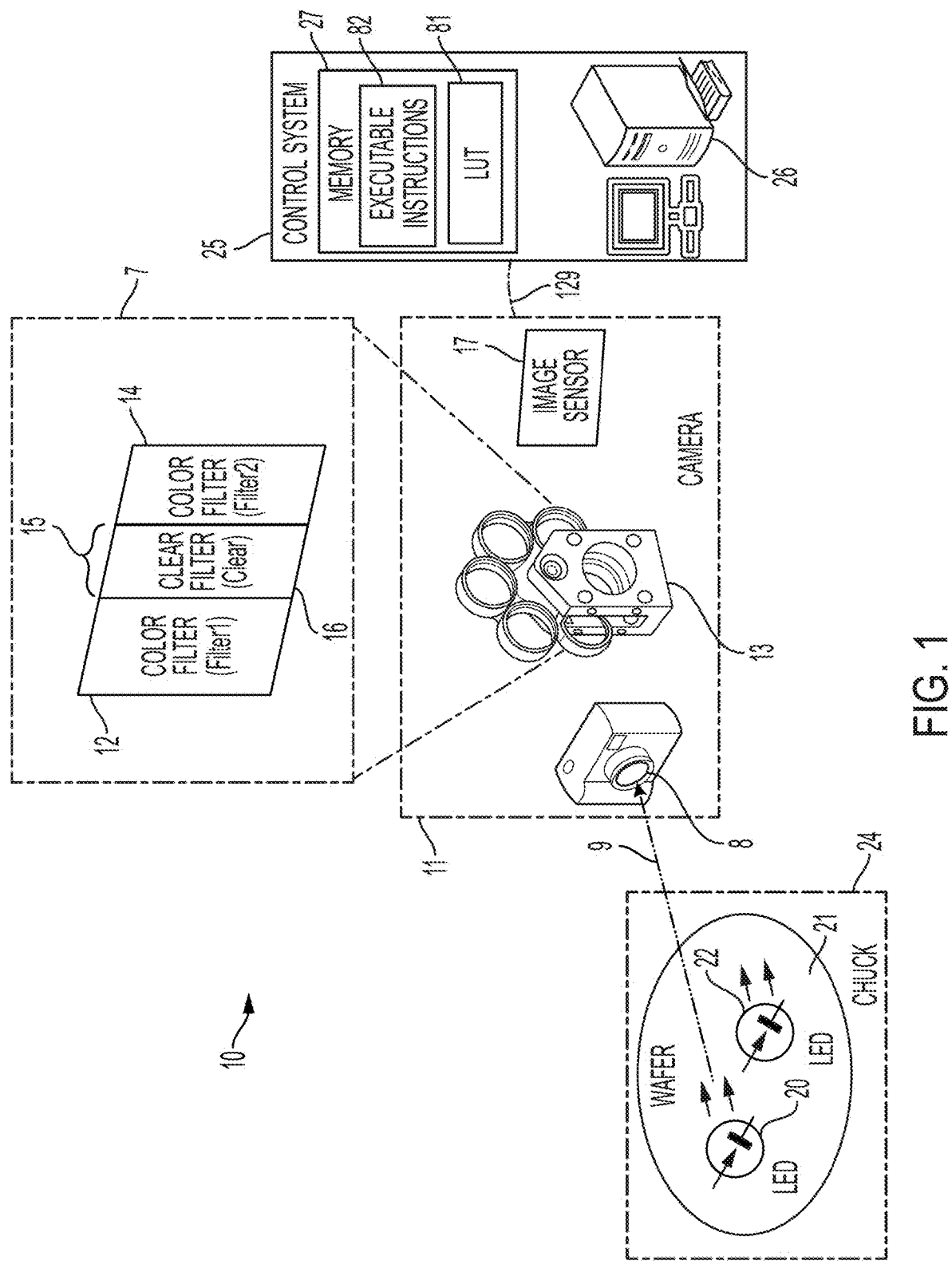
FIG. 1 is a block diagram of an example test system for testing light sources.

Referring to FIG. 1, an example test system 10 includes an imaging colorimeter comprised of a camera 11. Camera 11 includes a lens 8 directed at a wafer 21 containing LEDs to test. The lens is directed at the wafer in order to capture light 9 from the LEDs. In this example, camera 11 also includes a color filter wheel 13 having its standard tristimulus color filters replaced with a set of two or more color bandpass filters 12, 14 configured for use in determining at least the intensity/luminance, wavelength, and line width of LEDs. Luminance is a photometric measure of the luminous intensity per unit area of light travelling in a given direction. It describes the amount of light that passes through, is emitted from, or is reflected from a particular area, and falls within a given solid angle. The spectral relationship of color bandpass filters 12, 14 is shown in view 7, although the arrangement depicted in view 7 will not be the actual physical arrangement of the color bandpass filters in wheel 13. Color bandpass filters 12, 14 are referred to herein, respectively, as Filter1 and Filter2.

In the example implementation of FIG. 1, color bandpass filters 12, 14 are configured to filter light that is colored red, green or blue; however, in other implementations, color bandpass filters 12, 14 may be configured to filter light having other colors, such as cyan, magenta, and yellow. Color bandpass filters 12, 14 may have various spectral transmission characteristics—for example, they may be broadband or narrowband—and may have reasonably sharp transitions between their passband and stopband. The passband includes a range of light wavelengths that can pass through a color bandpass filter. The stopband includes a range of light wavelengths that the color bandpass filter attenuates to very low levels or that it prevents from passing through the color bandpass filter. For example, at a band edge, the color bandpass filter cuts-off wavelengths of light that do not pass through the color bandpass filter. Each color bandpass filter may have a different passband within the same color spectrum (e.g., red, green, or blue). In some implementations, the passbands of the color bandpass filters 12, 14 do not overlap. In some implementations, the passbands of the color bandpass filters 12, 14 may overlap. In some implementations, the passbands of the color bandpass filters 12, 14 may be equal or substantially equal, e.g., within 1%, 2% 3%, 4%, or 5% or the like of each other. Each color bandpass filter may have the same bandwidth, e.g., equal bandwidths.

Color bandpass filters 12, 14 each may have a width that is substantially equal to a line width of the LEDs that they used to measure. Line width refers to the full-width at half-maximum (FWHM) of emitted light in the optical spectrum of an LED under test.

In some examples, each color bandpass filter transition from passband to stopband is close to a wavelength of an LED (e.g., red, green, or blue light) to be filtered using the color bandpass filter. In some implementations, the stopband is close to the wavelength of an LED if the stopband is within half the line width of the LED to be filtered using the color bandpass filter. This configuration enables sensitivity to changes in wavelength. For example, a small change in LED wavelength produces a large change in the amount of light passed by the color bandpass filter. In some examples of a small change in LED wavelength producing a large change in the amount of light passed through a color bandpass filter, a change of LED wavelength of 1 nm may produce a change of 5% to 15% in the amount of light passed by the color bandpass filter. To measure intensity/luminance, wavelength, and line width of an LED, color bandpass filters 12, 14 may be arranged spectrally relative to each other—for example, there may be a spectral band gap between the two in some examples.

In some implementations, both color bandpass filters 12, 14 have transitions above and below the expected wavelength of an LED under test. In this example, both color bandpass filters will pass less light from an LED having a narrow line width, and conversely both color bandpass filters will pass more light from an LED having a wide line width. In some examples, "narrow" includes the LED line width FWHM being less than the nominal line width FWHM for which the filters were selected, and "wide" includes the LED line width FWHM being larger than that for which the filters were selected.

As noted previously, color bandpass filters 12, 14 are separated by a spectral band gap 15. In some implementations, the spectral band gap 15 between the filters may be occupied by a clear filter ("Clear") 16 configured to pass all wavelengths of light from all color LEDs. For example, clear filter 16 may be clear glass or plastic that allows all wavelengths of light to pass through the clear filter.

In some implementations, color filter wheel 13 is configured to hold multiple filters, including, color bandpass filters 12, 14 and clear filter 16, and is configured and controllable to rotate so that a specific filter is positioned in front of the image sensor. In the example of FIG. 1, color filter wheel 13 can hold at least six filters. In this example, filters 12, 14 and the clear filter 16 would be placed in three of the at least six filter positions.

In some implementations, to measure red, green and blue, a total of seven or more filters may be used, two color bandpass filters each for red spectrum light, two color bandpass filters each for green spectrum light, two color bandpass filters each for blue spectrum light, and a clear filter. Additional filters may be used for red spectrum light, green spectrum light, and blue spectrum light to enhance the sensitivity of the measurements described herein. Mechanically, this could be arranged with a suitably large filter wheel, capable of holding eight, nine, or ten filters. Some example commercially available colorimeters may include two filter wheels, one in front of the other. This configuration allows the two filter wheels hold up to twelve filters in total, and enables selection of any combination of one filter from one wheel and another filter from another wheel.

Camera 11 also includes an image sensor 17. Image sensor 17 includes pixels that capture images based on filtered light from LEDs received by camera 11 and passed through filters 12, 14, 16. In some cameras, there may be millions of pixels on the image sensor, which enables capturing images of light from millions of LEDs. Pixels on the camera's image sensor 17 capture images of light transmitted through the color bandpass filters from specific LEDs. For example, a given set of one or more pixels on image sensor 17 may capture images from a particular LED 20 (shown not to scale) on wafer 21, whereas a different set of one or more pixels on images sensor 17 may capture images from different LED 22 on wafer 21 (also shown not to scale). By capturing images of specific LEDs on specific pixels, and knowing which pixels correspond to which LEDs, test system 10 is able to identify which images came from which LEDs and then process information from those images as described herein to determine whether that LED has passed or failed testing. Because the image sensor contains a large number of pixels, large numbers of LEDs can be tested concurrently. Wafer 21 may be held on a chuck 24 or other appropriate structure during testing.

Test system 10 also includes a control system 25, which may include one or more processing devices 26 of the type described herein, to process images from camera 11 to test one or more LEDs on a wafer 24 as described herein. Control system may also include memory 27 storing instructions 82 that are executable by one or more processing devices 26 to control the mechanical aspects of system 10, such as movement of color wheel 13 and/or chuck 24, and to process images captured by camera 11's image sensor as described herein using a look-up table (LUT) 81 or other type of database that stores information corresponding to the filtered light. In this example, LUT 81 includes information such as, but not limited to, LED wavelength, LED line width, an LED luminance value or luminance scale factor, and CIE 1931 color space x and y coordinates. Values based on measurements of the light for an LED under test filtered by color bandpass filters 12, 14 and clear filter 16 may be used to access the information in the LUT and to retrieve that information for the LED under test.

In this regard, in an example filter arrangement such as that of FIG. 1, the two color bandpass filters 12, 14 have opposite responses to variations in LED wavelength. For LED spectra over a small range of wavelengths, the logarithm of the ratio of light for an LED under test passed by the two color bandpass filters 12, 14 varies roughly linearly with the wavelength of the LED under test. In some examples, a small range of wavelengths includes a range of wavelengths of approximately 50 nm, 60 nm, or more or less, depending on filter selection. The light passed by color bandpass filters 12, 14 for an LED under test is obtained from images captured by pixels of the camera's image sensor for that LED. To normalize the filter values for variations in LED brightness, a third image may be captured of all wavelengths of the LED light using clear filter 16. Using these three images subjected to different types and/or amounts of filtering, test system 10 obtains information about LED luminance/intensity. This information may be used to generate values that access a LUT 82 (or other appropriate database) to obtain information for the LED under test including, but not limited to, wavelength, line width, luminance value or luminance scale factor, and/or CIE 1931 color space x and y coordinates.

Regarding color spaces, in the field of colorimetry, a color space is a construct or multi-dimensional (e.g., two- or three-dimensional) coordinates that mathematically describe different colors visible to the human eye, independent of overall intensity/luminance. The CIE 1931 color space is defined by measurements using tristimulus filters for red, green and blue, and a mathematical relationship between those measurements.

Figure 2:
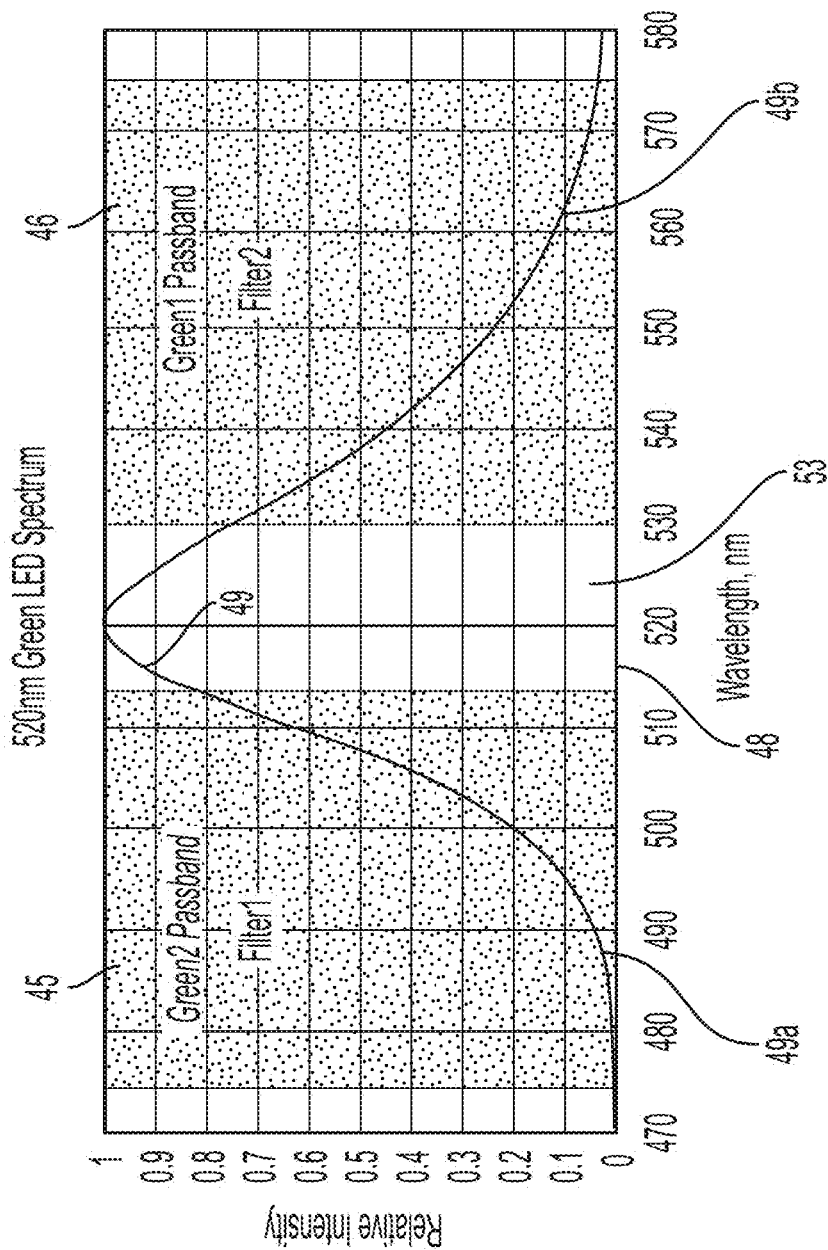
FIG. 2 is a block diagram of examples of color bandpass filters, a clear filter, and a green light spectrum.

Referring now to FIG. 2, in a particular, non-limiting example, to measure light from green LEDs using filter such as color bandpass filter 12, 14, two narrow bandpass filters covering different parts of the green portion of the spectrum may be used. The two filters, which are examples of Filter1 and Filter2 of FIG. 1 are referred by these names. The areas covered by Filter1 45 and Filter2 46 correspond to the passbands of filters Filter1 45 and Filter2 46 that pass light from green LEDs. More specifically, FIG. 2 shows example color bandpass filters Filter1 45 and Filter2 46, with Filter1 45 having a passband of about 475 nm to 513 nm and Filter2 46 having a passband of about 530 nm to about 575 nm. In this example, Filter1 45 and Filter2 46 are separated by a spectral (or wavelength) gap 48 of about 12 nm, which may be covered by a clear filter 53. Filter1 45 and Filter2 46 are examples only, and may be substituted with color bandpass filters having different green wavelength passbands or different passbands for different colors, such as red and blue (to test red and blue LEDs, respectively).

In this example, Filter1 45 and Filter2 46 are each rectangular in shape, narrowband, steep, and monotonic, although these are not requirements in all implementations. In some implementations, the filters may be first order filters, second order filters, third order filters, fourth order filters, and so forth. A filter may be narrowband if the filter only allows a small band of wavelengths to pass. A filter may be steep if its band edges are steep, that is, the filter produces a large change in transmission from 0% to 100% over a small range of wavelengths such as, but not limited to, wavelengths of less than 5 nm. A filter may be monotonic if its transmittance is always increasing or decreasing over a specified wavelength range. Each Filter1 45 and Filter2 46 also has a band edge within a predefined distance of a nominal wavelength of an LED whose light the filter passes. For example, Filter1 45 and Filter2 may each have a band edge that is within single-digit nanometers of, or tens of nanometers of, a nominal wavelength of an LED whose light the filter passes.

Figure 3:
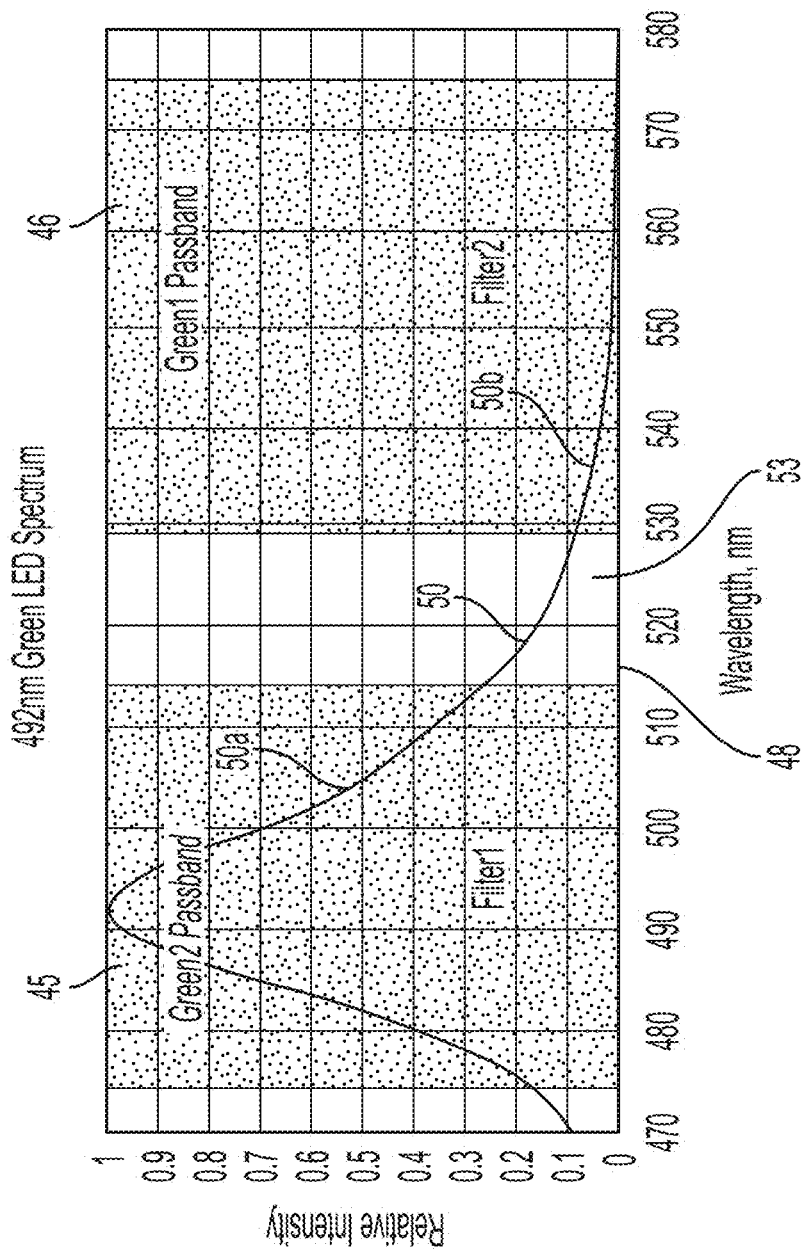
FIG. 3 is a block diagram of the example color bandpass filters and the clear filter of FIG. 2, with another green light spectrum.
Figure 4:
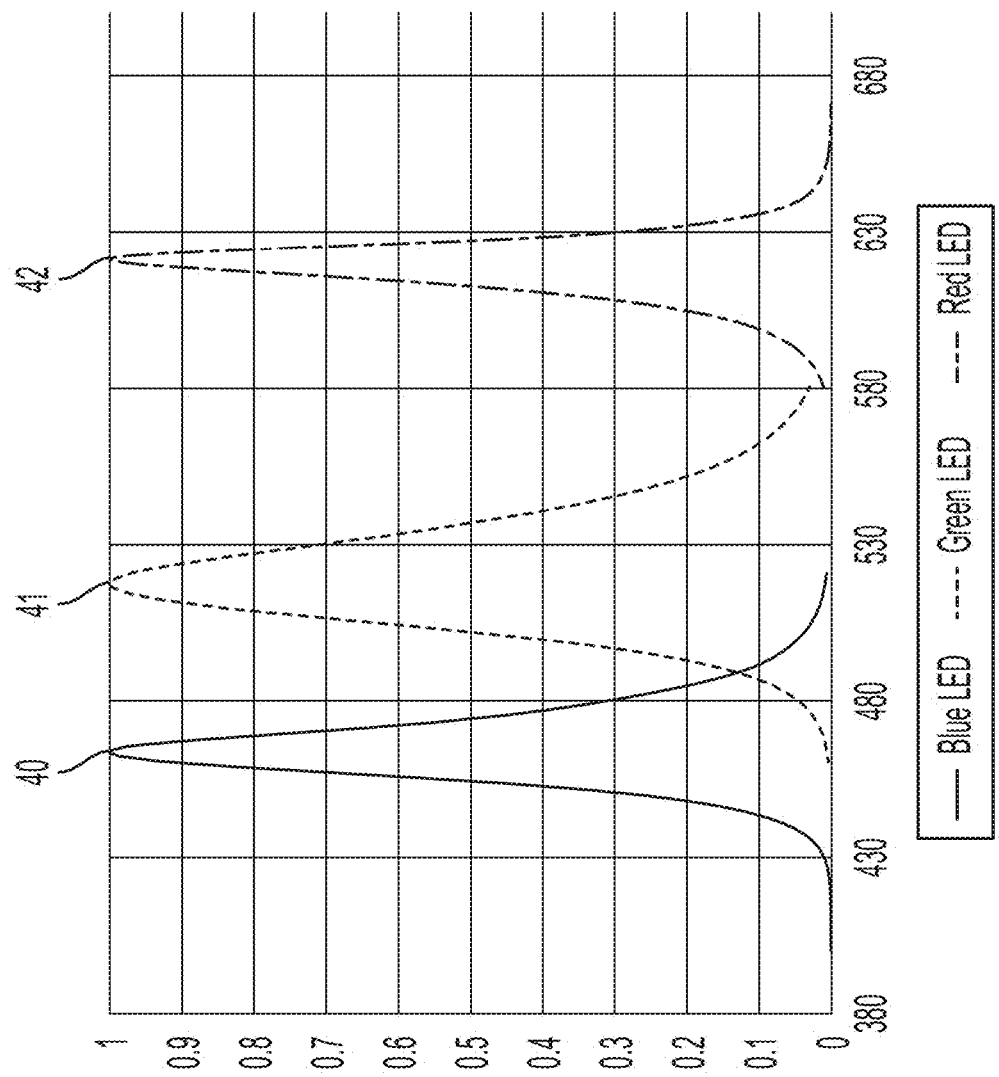
FIG. 4 is a graph showing example spectra for blue, green, and red.

FIG. 2 shows an example spectrum 49 for an example green LED having a 520 nm peak wavelength and the relative intensity/luminance 49a, 49b of light from that LED that Filter1 45 and Filter2 46 pass, respectively, for spectrum 49. FIG. 3 shows an example spectrum 50 for a different example LED having a shorter peak wavelength, 492 nm and the relative intensity/luminance 50a, 50b of light that from that LED that Filter1 45 and Filter2 46 pass, respectively for spectrum 50. In the example of FIG. 3, much more of the 492 nm LED spectrum 50a overlaps with the Filter1 passband, and less of the spectrum 50b overlaps with the Filter2 passband. Thus the amount of light measured through each of the two green filters, Filter1 45 and Filter2 46, will be sensitive to LED wavelength. Each of the two green filters, Filter1 45 and Filter2 46 are also sensitive to the spectral line width and the detailed shape of the spectrum. If the LED spectral line width FWHM increases compared to this example, both filters will pass a greater fraction of the light from the LED. Similarly if the spectral shape changes from approximately gaussian to some other shape, then the filters will pass a different amount of light from that spectrum.

Figure 5:
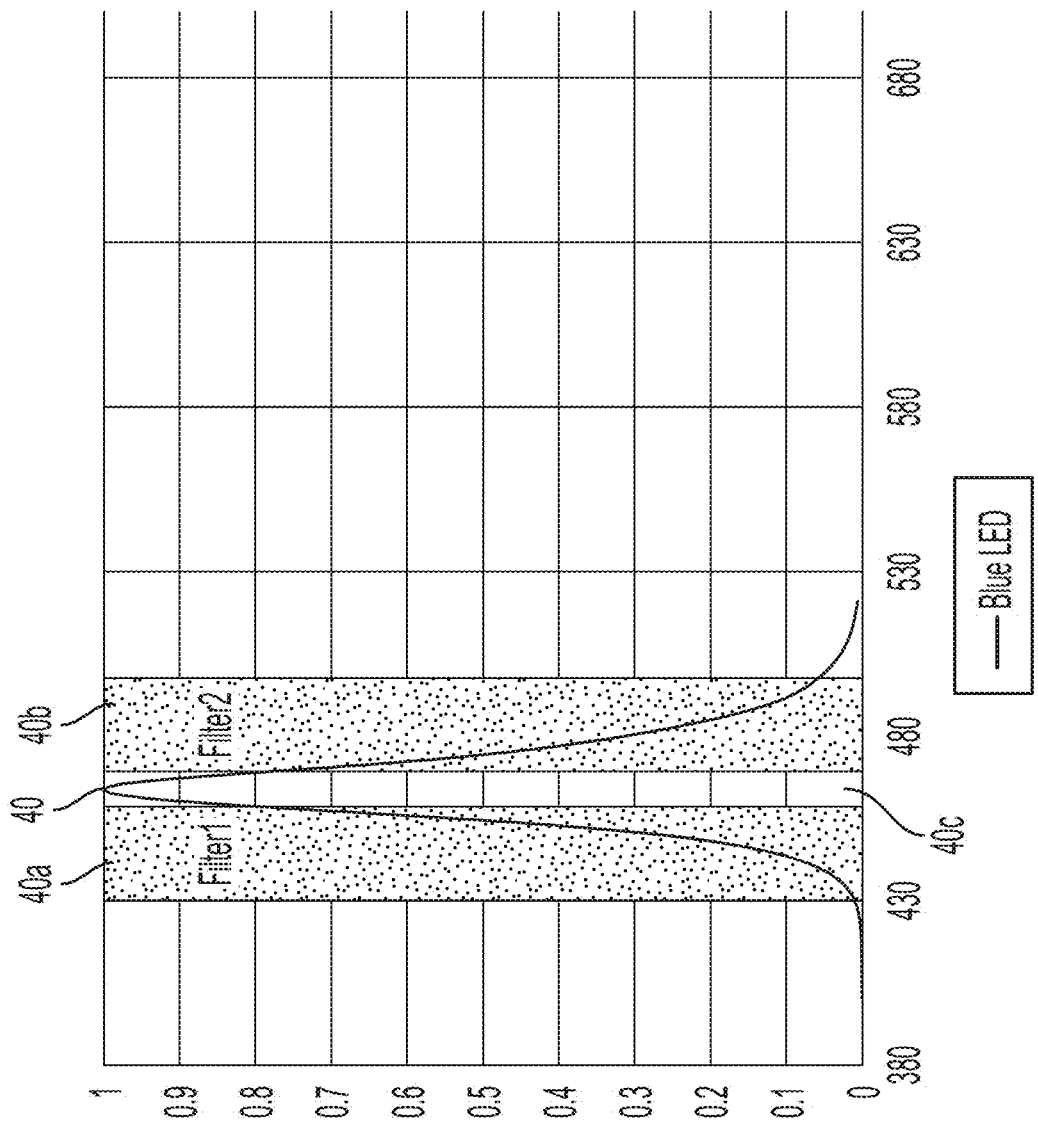
FIG. 5 is a block diagram of examples of color bandpass filters, a clear filter, and a blue light spectrum.
Figure 6:
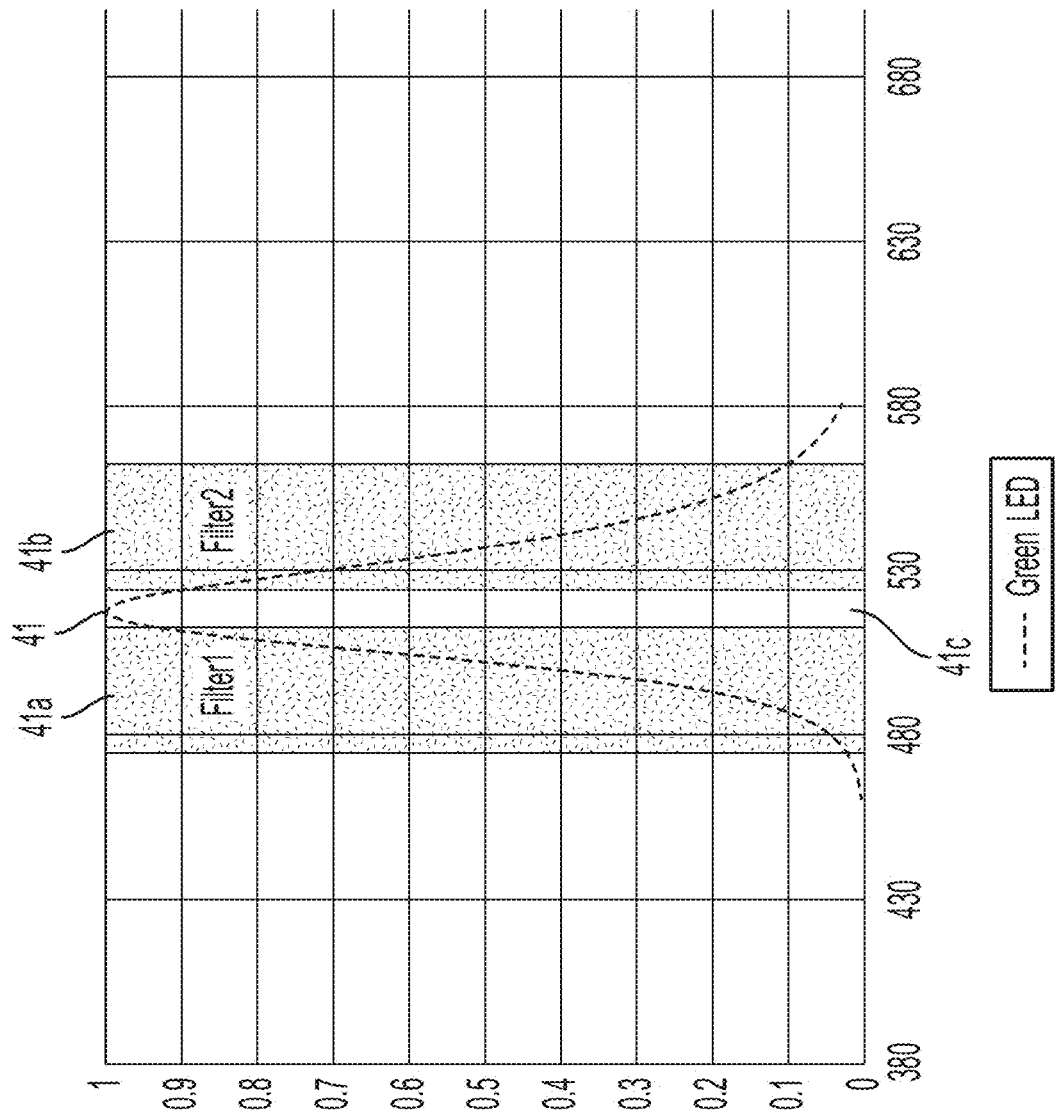
FIG. 6 is a block diagram of examples of color bandpass filters, a clear filter, and a green light spectrum.
Figure 7:
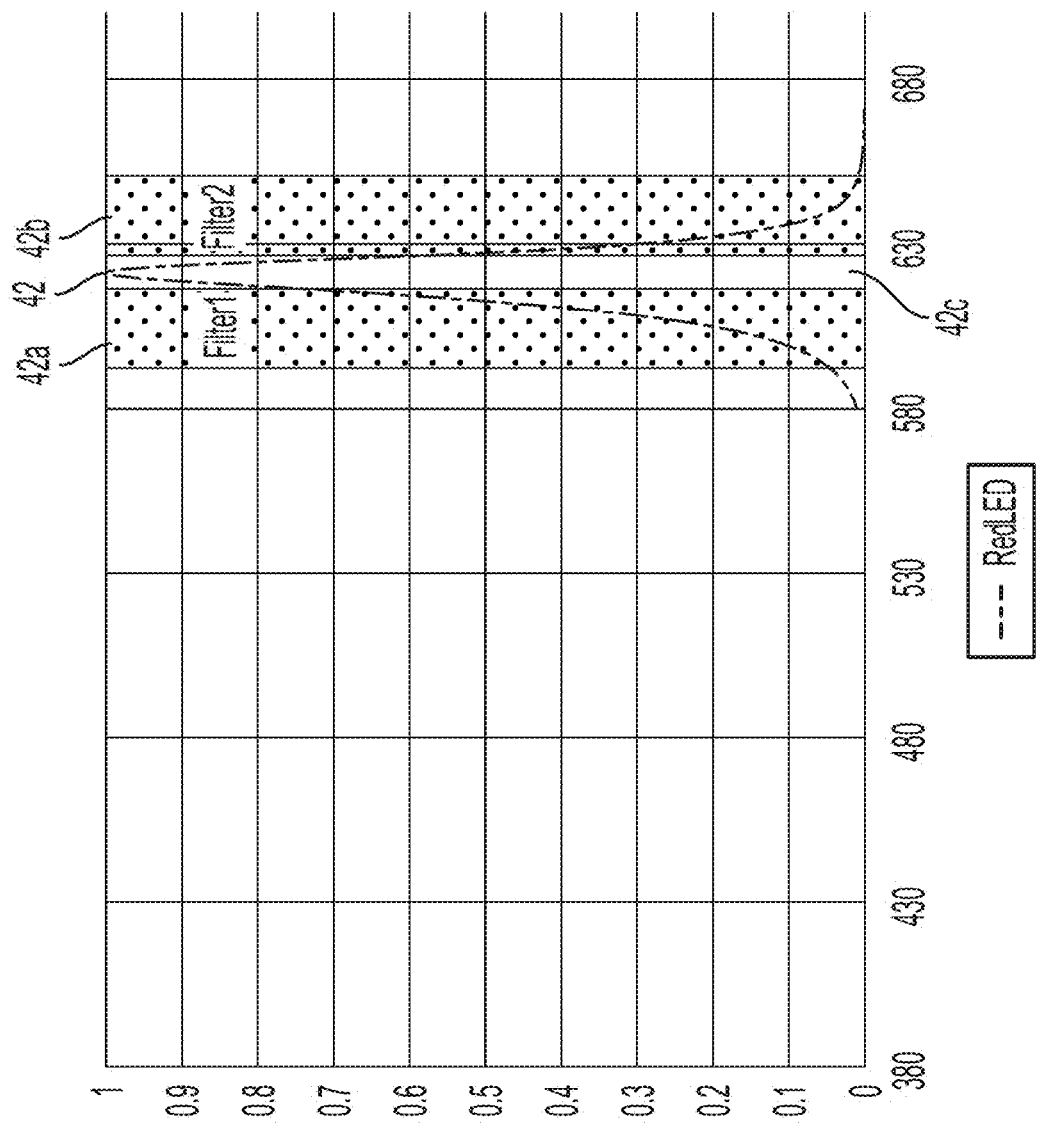
FIG. 7 is a block diagram of examples of color bandpass filters, a clear filter, and a red light spectrum.

For other examples of Filter1 and Filter2 shown in FIGS. 5, 6, and 7, FIG. 4 shows example spectra 40, 41, 42 for, respectively, blue light from a blue LED, green light from a green LED, and red light from a red LED. FIG. 5 shows example passbands of example blue color bandpass filters Filter1 40a, Filter2 40b between 435 nm and 455 nm and between 470 nm and 495 nm, respectively, with a 15 nm spectral gap 40c between them. FIG. 6 shows example passbands of example green color bandpass filters Filter1 41a, Filter2 41b between 477 nm and 511 nm and between 534 nm and 566 nm, respectively, with a 23 nm spectral gap 41c between them. FIG. 7 shows example passbands of example red color bandpass filters Filter1 42a, Filter2 42b between 598 nm and 613 nm and between 626 nm and 644 nm, respectively, with a 13 nm spectral gap 42c between them. A clear filter may cover each of the spectral gaps 40c, 41c, and 42c in some implementations. These are examples only; the passbands and stopbands of different color bandpass filters may be different than those described herein. Filters for primary and non-primary colors may be used.

Referring also back to FIG. 1, example LUT 81 includes data cells corresponding to values in a two-dimensional color space, which is different from the CIE 1931 color space, and which is defined by the following x and y values.

$$x = FilterRatioX = 10*\log_{10}(Filter1/Filter2)$$
$$y = FilterRatioY = 10*\log_{10}((Filter1 + Filter2)/\text{Clear})$$

In the two equations above, Filter1 refers to the intensity/luminance of light from an LED passing through Filter1 12, and Filter2 refers to the intensity/luminance of light from the same LED passing through Filter2 14. Clear in y refers to the intensity/luminance of light from the same LED passing through the Clear filter 16. Filter1/Filter2 refers to the ratio of the intensity/luminance of light from the same LED passing through Filter1 and Filter2.

Data cells in the LUT are populated with x and y value pairs and predetermined information about a color LED that corresponds to each of these x and y value pairs including, but not limited to, LED wavelength, LED line width, an LED luminance value or LED luminance scale factor, and CIE color space x and y coordinates. This predetermined information may be obtained from previously-performed tests of multiple LEDs using the system of FIG. 1, for example, and stored in the LUT.

Figure 8:
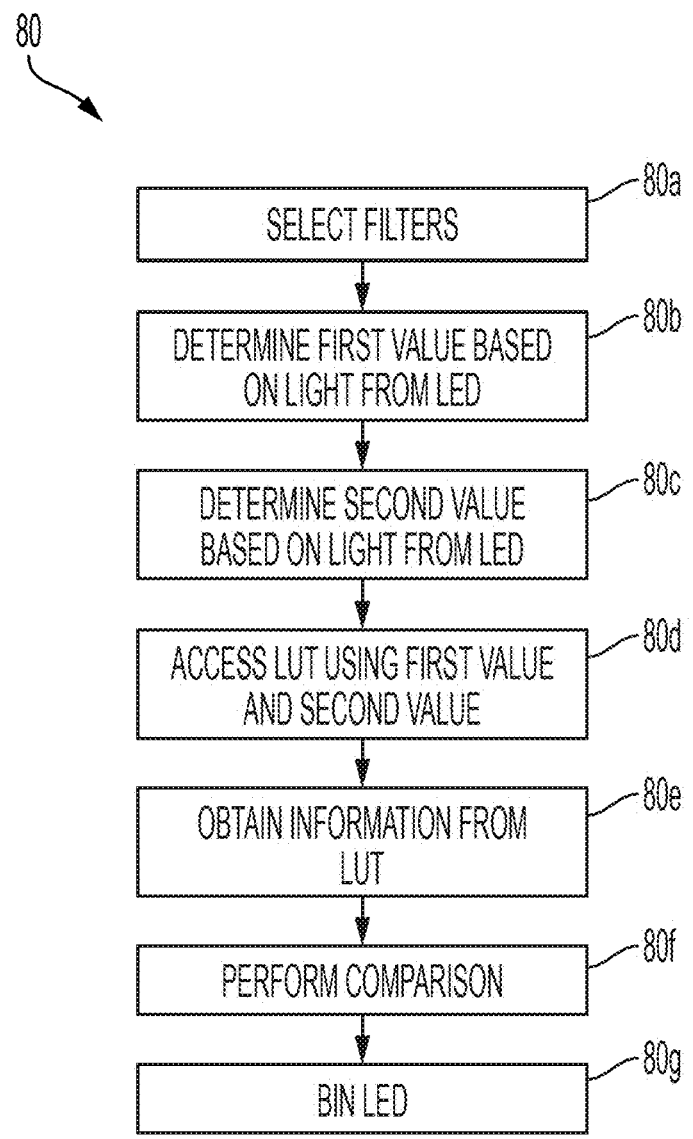
FIG. 8 is a flowchart showing example operations included in an example process for testing LEDs using the example system of claim 1.

FIG. 8 shows example operations included in an example process 80 for testing LEDs using example test system 10 (FIG. 1) including the example LUT 81 described herein. All or some of the operations may be performed by control system 25 executing instructions 82 in communication with camera 11.

Process 80 includes selecting (80a) filters, examples of which include, but are not limited to, the filters shown in FIGS. 2, 3 and 5 to 7. The filters may be selected based on an LED being tested. For example, if the filters are incorporated into a color wheel on the camera, the control system may receive, e.g., from a user, information about LEDs to be tested, such as their color, dominant wavelength, spectrum, and the like. The control system may control the color wheel to select appropriate filters, such as red, green, or blue Filter1, Filter2 having bandwidths that cover the wavelengths of the LED under test, and Clear. The motorized color bandpass filter wheel will move to place the selected filter between the lens and the image sensor.

Filter1 receives at least part the light from an LED under test on a wafer; Filter2 receives at least part of the light from the LED under test; and Clear receives at least part of the light from the LED under test. Filter1 passes/transmits a range of wavelengths of the light that it receives; Filter2 passes/transmits a range of wavelengths of the light that it receives, which range is different from the range of wavelengths transmitted through Filter1; and Clear passes/transmits all wavelengths of the light that it receives. The light that passed through the each of the three filters forms images on a set of pixels on image sensor 17 (FIG. 1). Control system 25 knows which pixels correspond to which LEDs on the wafer and, therefore, is able to determine the intensity/luminance of the filtered light from the LED under test by reading an image from the camera from pixels corresponding to the LED under test.

Process 80 determines (80b) a first value based on the intensity/luminance of light passing through Filter1 and Filter2. Process determines a second value (80c) based on the intensity/luminance of light passing through Filter1, Filter2, and Clear. In the example implementations described herein, the first value x, and the second value y, are determined as follows and as described above.

$$x = FilterRatioX = 10*\log_{10}(Filter1/Filter2)$$
$$y = FilterRatioY = 10*\log_{10}((Filter1 + Filter2)/\text{Clear})$$

Process 80 includes accessing (80d) LUT 81 (FIG. 1) using the values of x and y determined above. As explained previously, the LUT has been populated with x and y value pairs and information about a color LED that corresponds to these x and y value pairs including, but not limited to, wavelength, line width, a luminance value or luminance scale factor, and CIE color space x and y coordinates. Process 80 uses the determined x and y values to obtain (80e) information about the LED under test from the LUT. That information may include the dominant wavelength (e.g., a red, green, or blue wavelength) of the LED under test, the line width of the LED under test, the intensity/luminance of the LED under test or an intensity/luminance scale factor for the LED under test that may be used to determine the intensity/luminance of the LED under test, and/or the and CIE color space x and y coordinates for the LED under test. In implementations where the intensity/luminance scale factor is obtained, the intensity/luminance of light from the Clear filter is multiplied by the intensity/luminance scale factor to determine the intensity/luminance of the LED under test.

Figure 9:
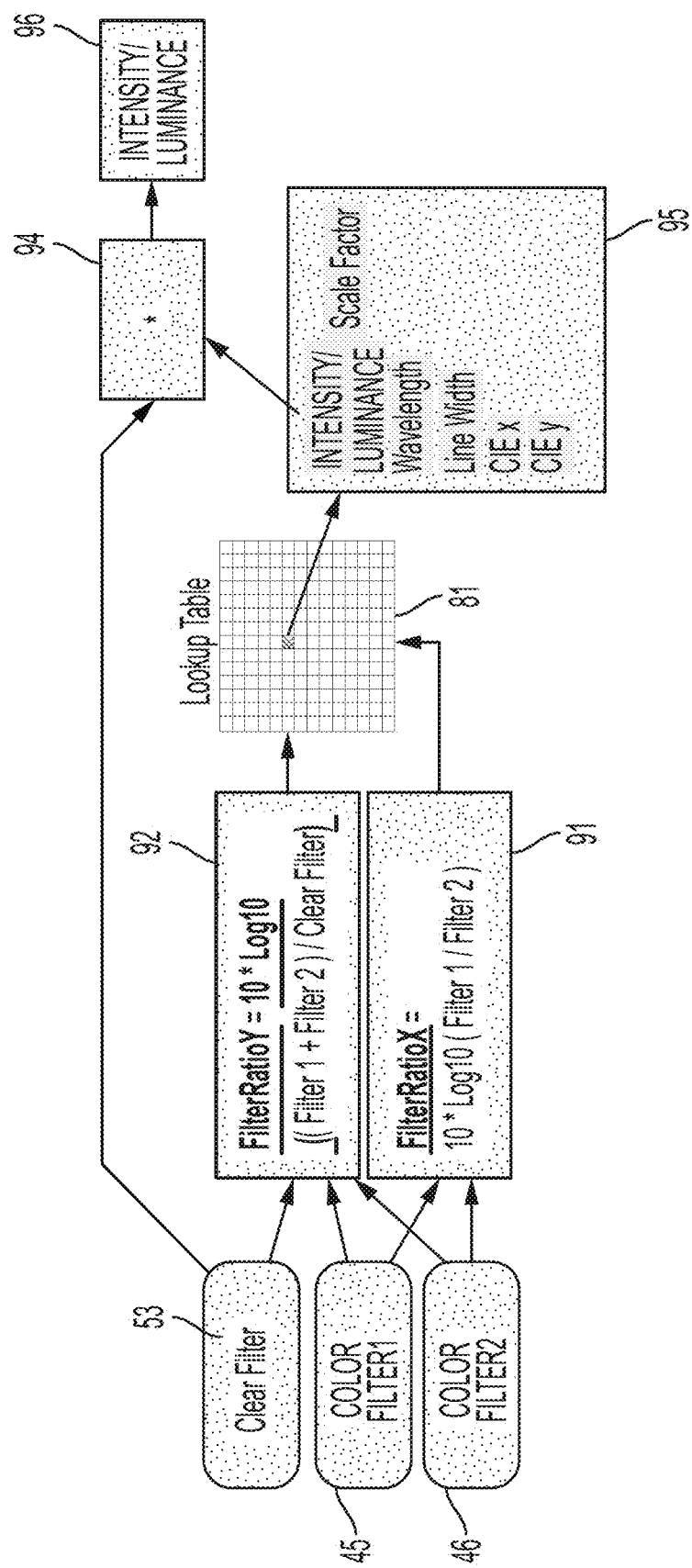
FIG. 9 is a block diagram showing, conceptually, accessing look-up table content based on values obtained from filtered light.

FIG. 9 shows example operations 80a to 80e graphically. Using the example filters of FIGS. 2 and 3, intensity/luminance measurements from Filter1 45, Filter2 46, and Clear 53 are used to determine the x value (FilterRatioX) 91 and the y value (FilterRatioY) 92. These values are used to access LUT 81, which contains information 95 at the corresponding x,y location in the LUT. In this example process 80 combines the intensity/luminance scale factor 94 with the intensity/luminance of light transmitted through the clear filter to determine the intensity/luminance 96 of the LED under test.

Referring back to FIG. 8, process 80 compares (80f) the information it determined from LUT 81 to predefined expected information for the LED under test. For example, process 80 may compare the wavelength from the LUT to a predefined expected wavelength for the LED under test; process 80 may compare the line width obtained from the LUT to the predefined expected line width for the LED under test; and/or process 80 may compare the intensity/luminance of the LED under test obtained from, or based on information from, the LUT to a predefined expected intensity luminance for the LED under test. Process 80 may then bin (80g) the LED under test based on the comparison (80f). For example, if the LED under test has a wavelength within a specific range, it may be binned accordingly; if the LED has a line width within a specific range, it may be binned accordingly; if the LED has a wavelength, line width, and/or intensity/luminance outside of an acceptable range (e.g., not within a range defined by an upper magnitude and a lower magnitude for one or more of wavelength, line width, and/or intensity/luminance), it may be binned as a failed LED; if the LED has a wavelength, line width, or intensity/luminance within an acceptable range (e.g., within a range defined by an upper magnitude and a lower magnitude for one or more of wavelength, line width, and/or intensity/luminance), it may be binned as a pass LED; and so forth. Binning may include assigning the LED a status such as, but not limited to, pass or fail, based on one or more of the foregoing, or other comparisons.

LUT 81 may be populated by performing operations 80*a* to 80*c* on, e.g., hundreds, thousands, or more LEDs having known wavelength, line width, luminance value or luminance scale factor, and CIE color space x and y coordinates. The first value determined in operation 80*a* and the second value determined in operation 80*b* may be stored in LUT 81 along with the corresponding wavelength, line width, luminance value or luminance scale factor, and CIE color space x and y coordinates. These operations may be performed prior to testing LEDs using process 80.

In some implementations, the clear filter and the transmission filters (Clear and Filter1, Filter2, respectively) described herein may be replaced by notch filters. An example notch filter is a type of filter that has a stop band and that attenuates or blocks frequencies or wavelengths within a specific range while passing all other frequencies. In some implementations a notch filter is used like the clear filter except there is a cut-out in the pass-band that covers the central portion of the expected wavelengths. This may be more sensitive to small changes in LED spectral line width than the clear filter when used with Filter1 and Filter2. The equation for FilterRatioY is altered to account for the notch filter, as shown below.

$$y = FilterRatioY = 10 * \log_{10}(\text{Notch}/(\text{Notch} + Filter1 + Filter2)).$$

Figure 10:
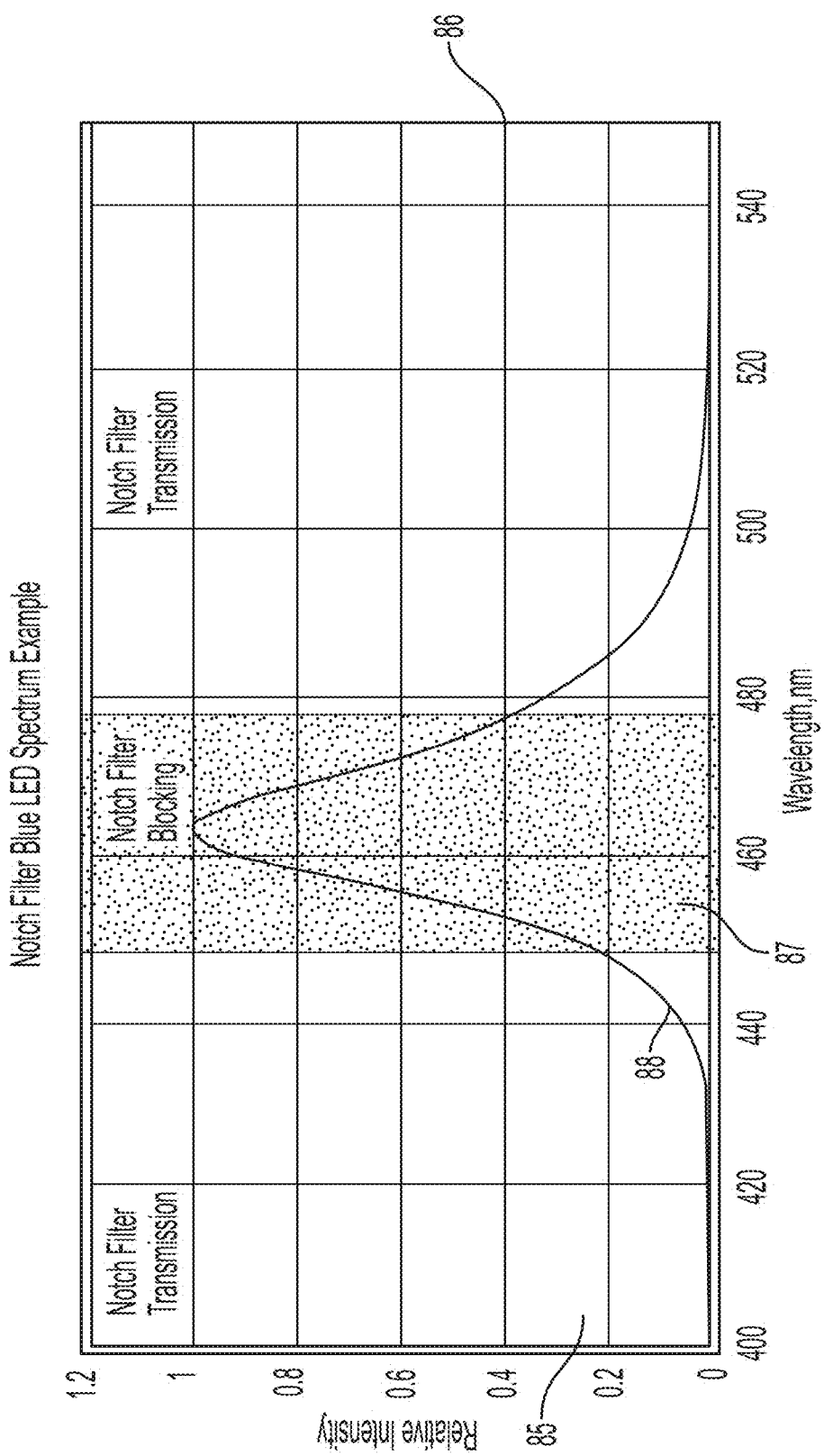
FIG. 10 is a block diagram of examples of color bandpass notch filters, a notch blocking filter, and a blue light spectrum.

Referring to FIG. 10, in the equation above, the Filter1 and Filter2 values refer to the light passing through each of the two bandpass filters, the same as described in earlier sections. The main difference in this case is the clear filter is not used. Instead, the system uses the notch filter illustrated in FIG. 10. The notch (or band-stop) filter blocks light from the light source spectrum 88 over a narrow spectral range 87, while transmitting light in other spectral regions 85 and 86. The equation for x=FilterRatioX may not change from that described previously in this example.

In some implementations, the filter configuration may include two bandpass filters such as Filter1 and Filter2, a clear filter such as Clear, and a notch filter. The various filters would be installed on the filter wheel of the camera, such as filter wheel 13. Various ratios of the light passing through each of these four filters can be determined. The four measurements provide some redundancy of measurement data and may improve the accuracy of calculating three unknown values.

In some implementations, four measurements may be acquired: Filter1, Filter2, Notch, and Clear. The increased accuracy may come from the additional measurement relative to the above-described implementations that use three measurements. The additional measurement removes noise from FilterRatioY that may be caused by the addition of Notch+Filter1+Filter2. The values of x and y may be determined as follows.

$$x = FilterRatioX = 10 * \log_{10}(Filter1/Filter2)$$
$$y = FilterRatioY = 10 * \log_{10}(\text{Notch}/\text{Clear}).$$

In the two equations above, Filter1 refers to the intensity/luminance of light from an LED passing through Filter1, and Filter2 refers to the intensity/luminance of light from the same LED passing through Filter2. Clear in y refers to the intensity/luminance of light from the same LED passing through the Clear filter. Notch in y refers to the intensity/luminance of light from the same LED passing through the Notch filter. Filter1/Filter2 refers to the ratio of the intensity/luminance of light from the same LED passing through Filter1 and Filter2. Notch/Clear refers to the ratio of the intensity/luminance of light from the same LED passing through Notch and Clear.

All or part of the example systems and example processes described in this specification and their various modifications may be configured or controlled at least in part by one or more computers such as control system 25 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a circuit, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

As used herein, the terms "comprises," "comprising," "includes," "including," "has," "having," "contains," "containing," and any variations thereof, are intended to cover a non-exclusive inclusion, such that robots, systems, techniques, apparatus, structures, or other subject matter described or claimed herein that includes, has, or contains an element or list of elements does not include only those elements but can include other elements not expressly listed or inherent to such robots, systems, techniques, apparatus, structures, or other subject matter described or claimed herein.

All examples described herein are non-limiting.

In the description and claims provided herein, the adjectives "first", "second", "third", and the like do not designate priority or order unless context suggests otherwise. Instead, these adjectives may be used solely to differentiate the nouns that they modify.

Any mechanical, optical, or electrical connection herein may include a direct physical connection or an indirect physical connection that includes one or more intervening components. A connection between two electrically conductive components is an electrical connection unless context suggests otherwise.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
a first color bandpass filter to receive part of light from a light source;
a second color bandpass filter to receive part of the light from the light source, the first color bandpass filter and the second color bandpass filter each having a cutoff wavelength at a band edge, and the first color bandpass filter and the second color bandpass filter each having a band edge within a predefined distance of a nominal wavelength of the light source;
wherein the first color bandpass filter and the second color bandpass filter each is configured to output filtered light that is based on received parts of the light; and
one or more processing devices to perform operations that comprise determining at least first and second values based on the filtered light.

2. The system of claim 1, further comprising:
memory storing a look-up table (LUT) containing data corresponding to different wavelengths of light and line widths of light;
wherein the operations comprise obtaining a wavelength and a line width of the light from the LUT using the first and second values.

3. The system of claim 2, wherein the data is organized based on ratios that are based on filtered light.

4. The system of claim 2, wherein the first and second values comprise:
a first ratio based on a first intensity of first filtered light output from the first color bandpass filter and the second color bandpass filter; and
a second ratio based on a second intensity of second filtered light output from the first color bandpass filter and the second color bandpass filter.

5. The system of claim 4, further comprising:
a clear filter to pass visible light.

6. The system of claim 5, wherein the second value is based also on a third intensity of light output from the clear filter.

7. The system of claim 6, wherein the first value is:

$$10*\log_{10}((\text{first intensity of light})/(\text{second intensity of light})); \text{ and}$$

wherein the second value is:

$$10*\log_{10}(((\text{first intensity of light})+(\text{second intensity of light}))/(\text{third intensity of light})).$$

8. The system of claim 1, wherein at least one of the first color bandpass filter or the second color bandpass filter is rectangular in shape.

9. The system of claim 1, wherein each of the first color bandpass filter and the second color bandpass filter has a cutoff that is steep and monotonic.

10. The system of claim 1, wherein the first color bandpass filter and the second color bandpass filter each has a width that is substantially equal to a spectral line width of the light source.

11. The system of claim 2, wherein the operations comprise:
comparing at least one of the wavelength or the line width to a predefined wavelength or a predefined line width, respectively; and
binning the light source based on the comparing.

12. The system of claim 11, wherein comparing comprises:
comparing the wavelength to an upper limit and to a lower limit, the upper limit having a greater magnitude than the lower limit; and
wherein binning comprises storing data for the light source based on whether the wavelength is between the upper and lower limit.

13. The system of claim 12 wherein, if the wavelength is between the upper limit and the lower limit, the data indicates that the light source has passed testing; and
wherein, if the wavelength is above the upper limit or below the lower limit, the data indicates that the light source has failed testing.

14. The system of claim 1, wherein the light source comprises a light emitting diode (LED).

15. The system of claim 1, wherein cutoff wavelengths of the first color bandpass filter and the second color bandpass filter are separated by a spectral gap.

16. The system of claim 15, wherein the spectral gap is different for different colors of light.

17. The system of claim 1, wherein the first color bandpass filter and the second color bandpass filter have equal bandwidths.

18. The system of claim 1, further comprising:
a camera to capture the light from the light source, the first color bandpass filter and the second color bandpass filter being part of a component configured for incorporation into the camera.

19. The system of claim 18, wherein the light source is on a wafer under test and a lens of the camera is directed at the wafer to capture the light from the light source.

20. The system of claim 1, wherein a spectral gap between band edges of the first and second color bandpass filters is on the order of single-digit nanometers to tens of nanometers.

21. A system comprising:
a first color bandpass filter to receive parts of light from light sources having known wavelengths and line widths;
a second color bandpass filter to receive parts of the light from the light sources having the known wavelengths and line widths, the first color bandpass filter and the second color bandpass filter each having a cutoff wavelength at a band edge, and the first color bandpass filter and the second color bandpass filter each having a band edge that is within single-digit nanometers of a nominal wavelength of a light source, the first color bandpass filter and the second color bandpass filter being separated by a spectral gap;

wherein the first color bandpass filter and the second color bandpass filter each is configured to output filtered light that is based on received parts of the light from each light source; and one or more processing devices to perform operations that comprise:

determining two values based on filtered light from each light source, the two values corresponding to a color space; and populating a database with information corresponding to the two values.

22. The system of claim 21, wherein the database comprises a look-up table.

23. The system of claim 21, wherein the values comprise ratios.

24. A system comprising:

a first color bandpass filter to receive part of light from a light source;

a second color bandpass filter to receive part of the light from the light source, the first color bandpass filter and the second color bandpass filter each having a cutoff wavelength at a band edge, and the first color passband filter and the second color bandpass filter each having a band edge that is within a predefined distance of a nominal wavelength of the light source, the first color bandpass filter having a first passband, the second color bandpass filter having a second passband;

wherein the first color bandpass filter and the second color bandpass filter each is configured to output filtered light that is based on received parts of the light; and one or more processing devices to perform operations that comprise determining first and second values based on the filtered light, the first and second values corresponding to a color space.

25. The system of claim 24, further comprising:
a notch filter having a stopband.

26. The system of claim 25, further comprising:

memory storing data corresponding to different wavelengths of light and line widths of light, the data being organized based on ratios from color-bandpass-filtered light;

wherein the first and second values comprise:

a first value based on a first intensity of first filtered light output from the first color bandpass filter and a second intensity of second filtered light output from the second color bandpass filter; and a second value based on the first intensity of first filtered light output from the first color bandpass filter, the second intensity of second filtered light output from the second color bandpass filter, and a third intensity of third filtered light output from the notch filter.

27. The system of claim 26, wherein the first value is:

$10*\log_{10}((\text{first intensity of light})/(\text{second intensity of light}))$; and wherein the second value is:

$10*\log_{10}((\text{third intensity of light})/(\text{third intensity of light}+\text{first intensity of light}+\text{second intensity of light}))$.

28. The system of claim 24, wherein the predefined distance is on the order of single-digit nanometers to tens of nanometers.

* * * * *